United States Patent
Wang et al.

(10) Patent No.: US 7,816,817 B2
(45) Date of Patent: Oct. 19, 2010

(54) POWER SUPPLY CIRCUIT ON MOTHERBOARD

(75) Inventors: Dao-Wei Wang, Shenzhen (CN); Kang Wu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 185 days.

(21) Appl. No.: 12/173,754

(22) Filed: Jul. 15, 2008

(65) Prior Publication Data

US 2009/0302684 A1 Dec. 10, 2009

(30) Foreign Application Priority Data

Jun. 10, 2008 (CN) .................... 2008 1 0302072

(51) Int. Cl.
*H01H 9/54* (2006.01)
(52) U.S. Cl. ...................................... 307/140
(58) Field of Classification Search ............. 307/140
See application file for complete search history.

(56) References Cited

U.S. PATENT DOCUMENTS

2005/0122131 A1* 6/2005 McCollum et al. ............ 326/30
2009/0106565 A1* 4/2009 Xiong ........................ 713/300

* cited by examiner

*Primary Examiner*—Robert L. DeBeradinis
(74) *Attorney, Agent, or Firm*—D. Austin Bonderer

(57) ABSTRACT

A circuit includes a work-power module, an electronic component, a switching apparatus, and a power control unit. The power control unit includes an input pin connected to the work-power module, an output pin connected to the electronic component, and a control pin connected to the switching apparatus. The switching apparatus is capable of controlling the status of the power control unit. Upon the condition that the power control unit is turned on, the work-power module is capable of supplying power to the electronic component. Upon the condition that the power control unit is turned off, the work-power module is not capable of supplying power to the electronic component.

15 Claims, 4 Drawing Sheets

POWER SUPPLY CIRCUIT ON MOTHERBOARD

BACKGROUND

1. Field of the Invention

The present invention relates to a power supply circuit on a motherboard.

2. Description of Related Art

The motherboard of a typical computer consists of a large printed circuit board. It holds electronic components, as well as physical connectors (sockets, slots, and headers) into which other electronic components may be inserted or attached. When the motherboard is boot-strapped, the system power supplies power to all the electronic components on the motherboard.

But not all of the electronic components on the motherboard need to be on all the time, given that they constantly consume power.

DETAILED DESCRIPTION

Figure 1:
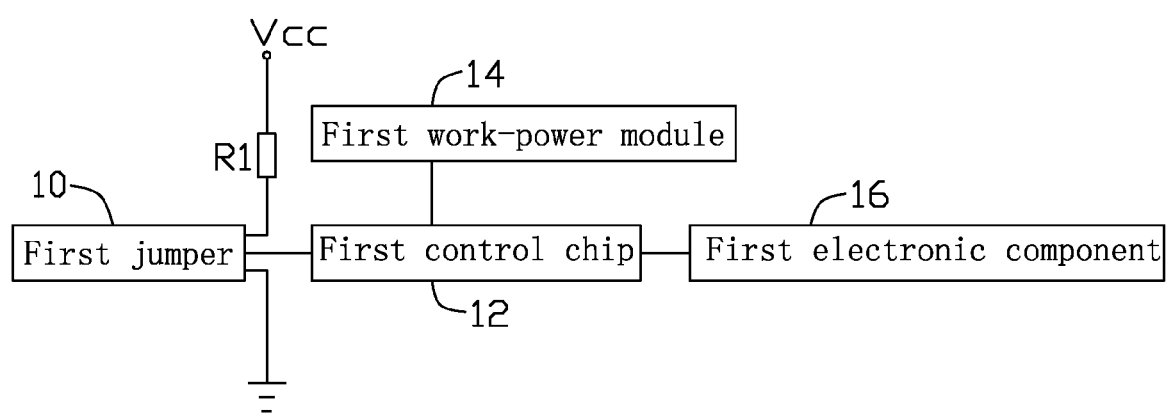
FIG. 1 is a block diagram of the first embodiment of a power supply circuit on a motherboard in accordance with the present invention.

Referring to FIG. 1, a power supply circuit on a motherboard in accordance with a first embodiment of the present invention includes a first switch apparatus such as a first jumper 10, and a first power control unit such as a first control chip 12. The first jumper 10 includes a first jumper power pin, a first jumper ground pin, and a first jumper control pin. The first jumper power pin is connected to a control-power source Vcc via a first resistor R1. The first jumper ground pin is grounded. The first control chip 12 includes a first control chip low-enable pin, a first control chip input pin, and a first control chip output pin. The first jumper control pin is connected to the first control chip low-enable pin to control status of the first control chip 12. The first control chip input pin is connected to a first work-power module 14. The first control chip output pin is connected to a first electronic component 16.

When the first jumper power pin is coupled to the first jumper control pin, the first jumper control pin outputs a high level voltage, the first control chip low-enable pin is at a TTL high level, and the first control chip 12 is turned off. Thereby, the first electronic component 16 is not on and does not receive power. When the first jumper ground pin is coupled to the first jumper control pin, the first jumper control pin outputs a low level voltage, the first control chip low-enable pin is at a TTL low level, and the first control chip 12 is turned on. Thereby, the first electronic component 16 is supplied power and is on and working. In other embodiments, the first control chip low-enable pin can be a first control chip high-enable pin. When the first jumper power pin is coupled to the first jumper control pin, the first electronic component 16 receives power. And when the first jumper ground pin is coupled to the first jumper control pin, the first electronic component 16 does not receive power.

Figure 2:
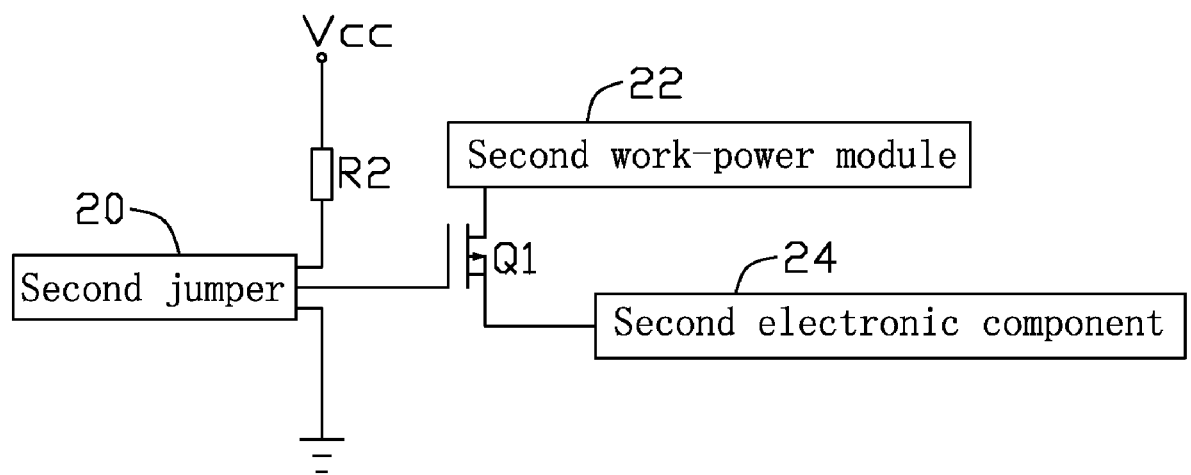
FIG. 2 is block diagram of the second embodiment of a power supply circuit on a motherboard in accordance with the present invention.

Referring to FIG. 2, a power supply circuit on a motherboard in accordance with a second embodiment of the present invention includes a second switch apparatus such as a second jumper 20, and a second power control unit such as a P type Metallic Oxide Semiconductor Field Effect Transistor (P-MOSFET) Q. The second jumper 20 includes a second jumper power pin, a second jumper ground pin, and a second jumper control pin. The second jumper power pin is connected to the control-power source Vcc via a second resistor R2. The second jumper ground pin is grounded. The gate of Q is connected to the second jumper control pin. The drain of Q is connected to a second work-power module 22. The source of Q is connected to a second electronic component 24.

When the second jumper power pin is coupled to the second jumper control pin, the second jumper control pin outputs a high level voltage. The gate of Q is at a TTL high level, and Q is turned off. Thereby, the second electronic component 24 does not receive power. When the second jumper ground pin is coupled to the second jumper control pin, the second jumper control pin outputs a low level voltage. The gate of Q is at a TTL low level, and Q is turned on. Thereby, the second electronic component 24 receives power.

Figure 3:
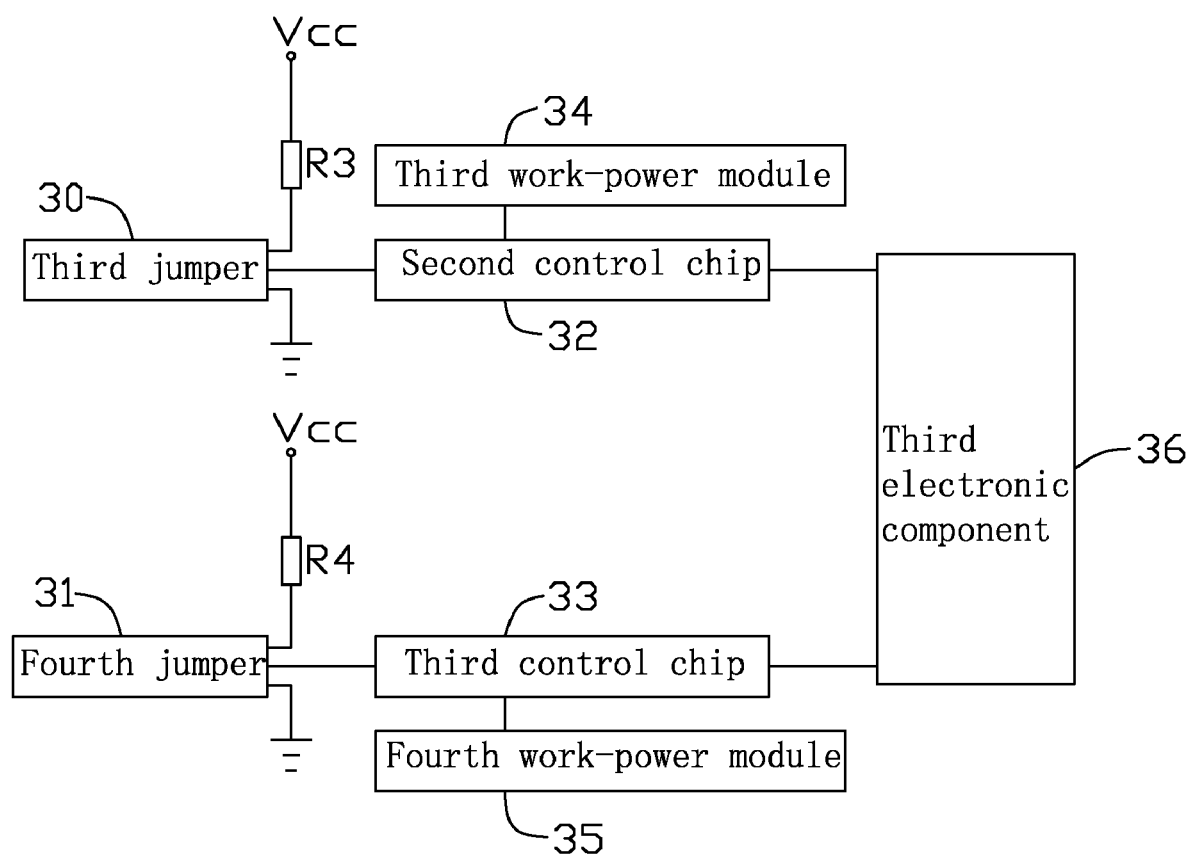
FIG. 3 is block diagram of the third embodiment of a power supply circuit on a motherboard in accordance with the present invention.

Referring to FIG. 3, a power supply circuit on a motherboard in accordance with a third embodiment of the present invention includes a third switch apparatus such as a third jumper 30, a fourth switch apparatus such a fourth jumper 31, a third power control unit such as a second control chip 32, and a fourth power control unit such as a third control chip 33. The third jumper 30 includes a third jumper power pin, a third jumper ground pin, and a third jumper control pin. The fourth jumper 31 includes a fourth jumper power pin, a fourth jumper ground pin, and a fourth jumper control pin. The third jumper power pin is connected to the control-power source Vcc via a third resistor R3. The fourth jumper power pin is connected to the control-power source Vcc via a fourth resistor R4. The third jumper ground pin and the fourth jumper ground pin are both grounded. The second control chip 32 includes a second control chip input pin, a second control chip output pin, and a second control chip low-enable pin. The third control chip 33 includes a third control chip input pin, a third control chip output pin, and a third control chip low-enable pin. The second control chip low-enable pin is connected to the third jumper control pin. The second control chip output pin is connected to a third electronic component 36. The second control chip input pin is connected to a third work-power module 34 with a first voltage. The third control chip low-enable pin is connected to the fourth jumper control pin. The third control chip output pin is connected to the third electronic component 36. The third control chip input pin is connected to a fourth work-power module 35 with a second voltage.

When the third jumper power pin is coupled to the third jumper control pin, and the fourth jumper ground pin is coupled to the fourth jumper control pin, the third jumper control pin outputs a high level voltage, and the fourth jumper control pin outputs a low level voltage. The second control chip low-enable pin is at a TTL high level, and the third control chip low-enable pin is at a TTL low level, so the second control chip 32 is turned off, and the third control chip 33 is turned on. Thereby, the third electronic component 36 receives the second voltage. When the third jumper ground pin is coupled to the third jumper control pin, and the fourth jumper power pin is coupled to the fourth jumper control pin, the third jumper control pin outputs a low level voltage, and the fourth jumper control pin outputs a high level voltage. The second control chip low-enable pin is at a TTL low level, and the third control chip low-enable pin is at a TTL high level, so the second control chip 32 is turned on, and the third control chip 33 is turned off. Thereby, the third electronic component 36 receives the first voltage. When the third jumper power pin is coupled to the third jumper control pin, and the fourth jumper power pin is coupled to the fourth jumper control pin, the third electronic component 36 does not receive any voltage.

In other embodiments, the second and third control chips 32, 33 can be replaced by two P-MOSFETs. The gates of the two P-MOSFETs are respectively connected to the third and fourth jumper control pins. The drains of the two P-MOSFETs are respectively connected to the third and fourth jumper power modules 34, 35. The sources of the two P-MOSFET Transistors are both connected to the third electronic component 36.

When the third jumper power pin is coupled to the third jumper control pin, and the fourth jumper ground pin is coupled to the fourth jumper control pin, the P-MOSFET Transistor which is connected to the third control chip 32 is turned off, and the P-MOSFET Transistor which is connected to the fourth control chip 33 is turned on. Thereby, the third electronic component 36 receives the second voltage. When the third jumper ground pin is coupled to the third jumper control pin, and the fourth jumper power pin is coupled to the fourth jumper control pin, the P-MOSFET Transistor, which is connected to the third control chip 32 is turned on, and the P-MOSFET Transistor which is connected to the fourth control chip 33 is turned off. Thereby, the third electronic component 36 receives the first voltage. When the third jumper power pin is coupled to the third jumper control pin, and the fourth jumper power pin is coupled to the fourth jumper control pin, the two P-MOSFET Transistors are both turned off. Thereby, the third electronic component 36 does not receive any voltage.

Figure 4:
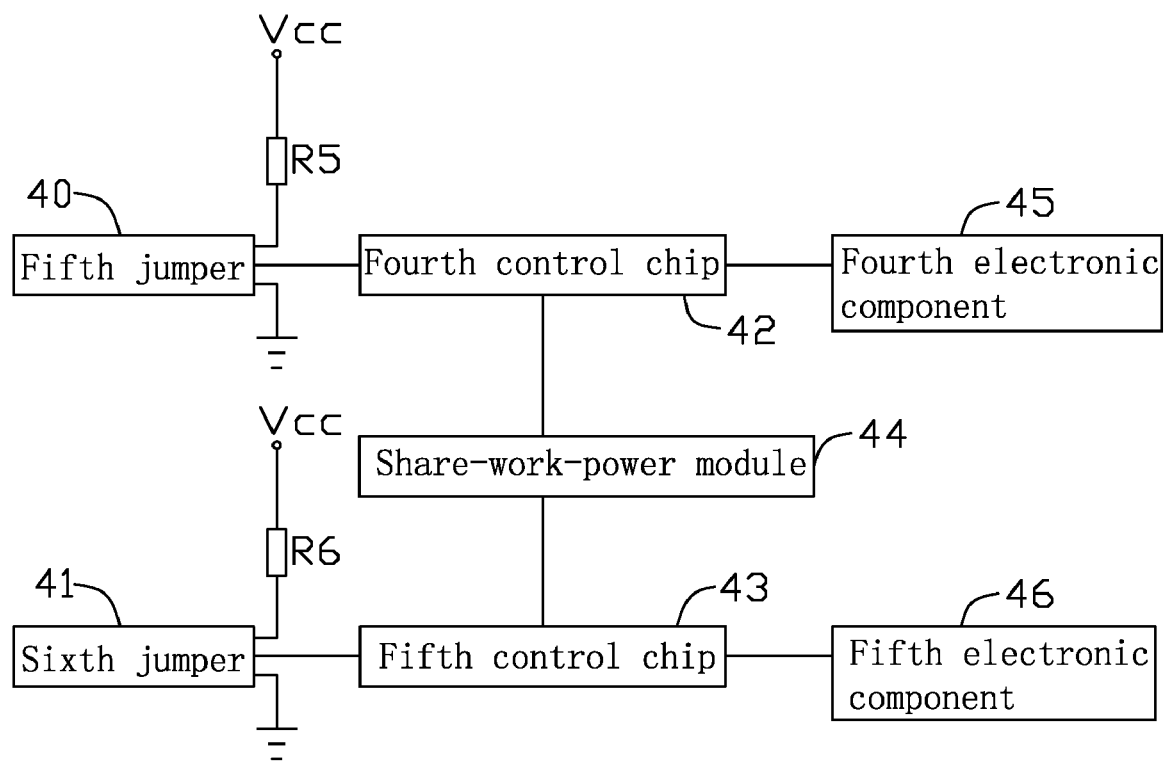
FIG. 4 is block diagram of the fourth embodiment of a power supply circuit on a motherboard in accordance with the present invention.

Referring to FIG. 4, a power supply circuit on a motherboard in accordance with a third embodiment of the present invention includes a fifth switch apparatus such as a fifth jumper 40, a sixth switch apparatus such a sixth jumper 41, a fifth power control unit such as a fourth control chip 42, and a sixth power control unit such as a fifth control chip 43. The fifth jumper 40 includes a fifth jumper power pin, a fifth jumper control pin, and a fifth jumper ground pin. The sixth jumper 41 includes a sixth jumper power pin, a sixth jumper control pin, and a sixth jumper ground pin. The fifth and sixth jumper power pins are connected to the control-power source Vcc respectively via a fifth resistor R5 and a sixth resistor R6. The fifth and sixth jumper ground pins are both grounded. The fourth control chip 42 includes a fourth control chip low-enable pin, a fourth control chip input pin, and a fourth control chip output pin. The fifth control chip 43 includes a fifth control chip low-enable pin, a fifth control chip input pin, and a fifth control chip output pin. The fourth and fifth control chip low-enable pins are respectively connected to the fifth jumper control pin and the sixth jumper control pin. The fourth and fifth control chip input pins are both connected to a share-work-power module 44. The fourth and fifth control chip output pins are respectively connected to a fourth electronic component 45 and a fifth electronic component 46. When the fifth jumper power pin is coupled to the fifth jumper control pin, the fourth electronic component 45 does not receive power. When the fifth jumper ground pin is coupled to the fifth jumper control pin, the fourth electronic component 45 receives power. When the sixth jumper power pin is coupled to the sixth jumper control pin, the fifth electronic component 46 does not work. When the sixth jumper ground pin is coupled to the sixth jumper control pin, the fifth electronic component 46 receives power.

In other embodiments, the fourth, fifth control chips 43 and 44 can be replaced by two P-MOSFET Transistors. The two gates of the two P-MOSFET Transistors are respectively connected to the fifth and the sixth jumper control pins. The two drains of the two P-MOSFET Transistors are both connected to the share-work-power module 44. The two sources of the two P-MOSFET Transistors are respectively connected to the fourth, fifth electronic components 45 and 46.

When the fifth jumper power pin is coupled to the fifth jumper control pin, the fourth electronic component 45 does not receive power. When the fifth jumper ground pin is coupled to the fifth jumper control pin, the fourth electronic component 45 receives power. When the sixth jumper power pin is coupled to the sixth jumper control pin, the fifth electronic component 46 does not receive power. When the sixth jumper ground pin is coupled to the sixth jumper control pin, the fifth electronic component 46 receives power.

In other embodiments, the P-MOSFET Transistors can be replaced by N-MOSFET Transistors. The jumpers can be replaced by other elements, such as switches with two throws. A first switch pin of one of the switches is connected to the control-power source Vcc. A second switch pin of one of the switches acts as a jumper control pin. A third switch pin of one of the switches is grounded.

The power supply circuit on a motherboard can supply power to each electronic component individually. When one of the electronic components on the motherboard is not working, the power supply circuit stops supplying power to the electronic component, and it saves power.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternately embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A circuit for controlling power supply on a motherboard, the motherboard comprising a first electronic component and a first work-power module, the circuit comprising:
   a first switching apparatus; and
   a first power control unit comprising:
      a first input pin connected to the first work-power module;
      a first output pin connected to the first electronic component; and
      a first control pin connected to the switching apparatus;
   wherein the first switching apparatus controls the status of the first power control unit via the first control pin, upon the condition that the first power control unit is turned on, the first work-power module supplies power to the first electronic component; upon the condition that the first power control unit is turned off, the first work-power module supplies no power to the first electronic component.

2. The circuit as claimed in claim 1, wherein the first switching apparatus is a first jumper, the first power control unit is a first control chip, the first jumper comprises:
- a first jumper power pin connected to a control power module;
- a first jumper ground pin being grounded; and
- a first jumper control pin selectively coupled to either the first jumper power pin or the first jumper ground pin, and the first jumper controlling the status of the first control chip;

the first control chip comprises:
- a first control chip enable pin connected to the first jumper control pin;
- a first control chip input pin connected to the first work-power module; and
- a first control chip output pin connected to the first electronic component.

3. The circuit as claimed in claim 1, wherein the first switching apparatus is a first jumper, the first power control unit is a Metallic Oxide Semiconductor Field Effect Transistor (MOSFET), the first jumper comprises:
- a first jumper power pin connected to a control-power module;
- a first jumper ground pin being grounded; and
- a first jumper control pin selectively connected to either the first jumper power pin or the first jumper ground pin, and the first jumper controlling the status of the MOSFET;

the MOSFET comprises:
- a gate connected to the first jumper control pin;
- a drain connected to the first work-power module; and
- a source connected to the first electronic component.

4. The circuit as claimed in claim 1, wherein the motherboard further comprises a second work-power module, the circuit further comprises:
- a second switching apparatus; and
- a second power control unit comprising:
  - a second input pin connected to the second work-power module;
  - a second output pin connected to the electronic component; and
  - a second control pin connected to the second switching apparatus;

the second switching apparatus controls the status of the second power control unit via the second control pin, upon the condition that the first power control unit is turned on, and the second power control unit is turned off, the first work-power module supplies power to the electronic component; upon the condition that the first power control unit is turned off, and the second power control unit is turned on, the second work-power module supplies power to the electronic component.

5. The circuit as claimed in claim 4, wherein the first switching apparatus is a first jumper, the second switching apparatus is a second jumper, the first power control unit is a first control chip, the second power control unit is a second control chip, the first jumper comprises:
- a first jumper power pin connected to a control-power module;
- a first jumper ground pin being grounded; and
- a first jumper control pin selectively coupled to either the first jumper power pin or the first jumper ground pin, and the first jumper controlling the status of the first control chip;

the second jumper comprises:
- a second jumper power pin connected to the control-power module;
- a second jumper ground pin being grounded; and
- a second jumper control pin selectively coupled to either the second jumper power pin or the second jumper ground pin, and the second jumper controlling the status of the second control chip;

the first control chip comprises:
- a first control chip enable pin connected to the first jumper control pin;
- a first control chip input pin connected to the first work-power module; and
- a first control chip output pin connected to the first electronic component; and the second control chip comprises:
- a second control chip enable pin connected to the second jumper control pin;
- a second control chip input pin connected to the second work-power module; and
- a second control chip output pin connected to the first electronic component.

6. The circuit as claimed in claim 4, wherein the first switching apparatus is a first jumper, the second switching apparatus is a second jumper, the first power control unit is a first Metallic Oxide Semiconductor Field Effect Transistor (MOSFET), the second power control unit is a second MOSFET, the first jumper comprises:
- a first jumper power pin connected to a control-power module;
- a first jumper ground pin being grounded; and
- a first jumper control pin selectively coupled to the first jumper power pin or the first jumper ground pin, and the first jumper controlling the status of the first MOSFET;

the second jumper comprises:
- a second jumper power pin connected to the control-power module;
- a second jumper ground pin being grounded; and
- a second jumper control pin selectively coupled to the second jumper power pin or the second jumper ground pin, and the second jumper controlling the status of the second MOSFET;

the first MOSFET comprises:
- a first gate connected to the first jumper control pin;
- a first drain connected to the first work-power module; and
- a first source connected to the first electronic component; and the second control chip comprises:
- a second gate connected to the second jumper control pin;
- a second drain connected to the second work-power module; and
- a second source connected to the first electronic component.

7. The circuit as claimed in claim 1, wherein the motherboard further comprises a second electronic component, the circuit further comprises:
- a second switching apparatus; and
- a second power control unit comprising:
  - a second input pin connected to the first work-power module;
  - a second output pin connected to the second electronic component; and
  - a second control pin connected to the second switching apparatus;

wherein the second switching apparatus controls the status of the second power control unit via the second control pin, upon the condition that the first power control unit is turned on, the first work-power module supplies power to the first electronic component; upon the condition that the second power control unit is turned on, the first work-power module supplies power to the second electronic component.

8. The circuit as claimed in claim 7, wherein the first switching apparatus is a first jumper, the second switching apparatus is a second jumper, the first power control unit is a first control chip, the second power control unit is a second control chip, the first jumper comprises:
a first jumper power pin connected to a control-power source;
a first jumper ground pin being grounded; and
a first jumper control pin selectively coupled to either the first jumper power pin or the first jumper ground pin, and the first jumper controlling the status of the first control chip;
the second jumper comprises:
a second jumper power pin connected to the control-power source;
a second jumper ground pin being grounded; and
a second jumper control pin selectively coupled to either the second jumper power pin or the second jumper ground pin, and the second jumper of controlling the status of the second control chip;
the first control chip comprises:
a first control chip enable pin connected to the first jumper control pin;
a first control chip input pin connected to the first work-power module; and
a first control chip output pin connected to the first electronic component; and
the second control chip comprises:
a second control chip enable pin connected to the second jumper control pin;
a second control chip input pin connected to the first work-power module; and
a second control chip output pin connected to the second electronic component.

9. The circuit as claimed in claim 7, wherein the first switching apparatus is a first jumper, the second switching apparatus is a second jumper, the first power control unit is a first Metallic Oxide Semiconductor Field Effect Transistor (MOSFET), the second power control unit is a second MOSFET, the first jumper comprises:
a first jumper power pin connected to a control-power source;
a first jumper ground pin being grounded; and
a first jumper control pin selectively coupled to the first jumper power pin or the first jumper ground pin, and the first jumper controlling the status of the first MOSFET;
the second jumper comprises:
a second jumper power pin connected to the control-power source;
a second jumper ground pin being grounded; and
a second jumper control pin selectively coupled to the second jumper power pin or the second jumper ground pin, and the second jumper of controlling the status of the second MOSFET;
the first MOSFET comprises:
a first gate connected to the first jumper control pin;
a first drain connected to the first work-power module; and
a first source connected to the first electronic component; and
the second control chip comprises:
a second gate connected to the second jumper control pin;

a second drain connected to the first work-power module; and
a second source connected to the second electronic component.

10. A circuit for controlling power supply on a motherboard, the motherboard comprising a first work-power module, a second work-power module, and a first electronic component, the first and second work-power modules have different voltages, the circuit comprising:
a first switching apparatus;
a first power control unit comprising:
a first input pin connected to the first work-power module;
a first output pin connected to the first electronic component; and
a first control pin connected to the first switching apparatus; and
a second switching apparatus;
a second power control unit comprising:
a second input pin connected to the second work-power module;
a second output pin connected to the first electronic component; and
a second control pin connected to the second switching apparatus;
wherein the first switching apparatus controls the status of the first power control unit via the first control pin, the second switching apparatus controls the status of the second power control unit via the second control pin, upon the condition that the first power control unit is turned on, and the second power control unit is turned off, the first work-power module supplies power to the first electronic component; upon the condition that the first power control unit is turned off, and the second power control unit is turned on, the second work-power module supplies power to the first electronic component.

11. The circuit as claimed in claim 10, wherein the first switching apparatus is a first jumper, the second switching apparatus is a second jumper, the first power control unit is a first control chip, the second power control unit is a second control chip, the first jumper comprises:
a first jumper power pin connected to a control-power module;
a first jumper ground pin being grounded; and
a first jumper control pin selectively coupled to either the first jumper power pin or the first jumper ground pin, and the first jumper controlling the status of the first control chip;
the second jumper comprises:
a second jumper power pin connected to the control-power module;
a second jumper ground pin being grounded; and
a second jumper control pin selectively coupled to either the second jumper power pin or the second jumper ground pin, and the second jumper controlling the status of the second control chip;
the first control chip comprises:
a first control chip enable pin connected to the first jumper control pin;
a first control chip input pin connected to the first work-power module; and
a first control chip output pin connected to the first electronic component; and
the second control chip comprises:
a second control chip enable pin connected to the second jumper control pin;

a second control chip input pin connected to the second work-power module; and a second control chip output pin connected to the first electronic component.

12. The circuit as claimed in claim 10, wherein the first switching apparatus is a first jumper, the second switching apparatus is a second jumper, the first power control unit is a first Metallic Oxide Semiconductor Field Effect Transistor (MOSFET), the second power control unit is a second MOSFET, the first jumper comprises:

a first jumper power pin connected to a control-power module;

a first jumper ground pin being grounded; and a first jumper control pin selectively coupled to the first jumper power pin or the first jumper ground pin, and the first jumper controlling the status of the first MOSFET;

the second jumper comprises:
  a second jumper power pin connected to the control-power module;
  a second jumper ground pin being grounded; and
  a second jumper control pin selectively coupled to the second jumper power pin or the second jumper ground pin, and the second jumper controlling the status of the second MOSFET;

the first MOSFET comprises:
  a first gate connected to the first jumper control pin;
  a first drain connected to the first work-power module; and
  a first source connected to the first electronic component; and the second control chip comprises:
  a second gate connected to the second jumper control pin;
  a second drain connected to the second work-power module; and
  a second source connected to the first electronic component.

13. A circuit for controlling power supply on a motherboard, the motherboard comprising a share-work-power module, a first electronic component, and a second electronic component, the circuit comprising:

a first switching apparatus;

a first power control unit comprising:
  a first input pin connected to the share-work-power module;
  a first output pin connected to the first electronic component; and
  a first control pin connected to the first switching apparatus;

a second switching apparatus; and a second power control unit comprising:
  a second input pin connected to the share-work-power module;
  a second output pin connected to the second electronic component; and
  a second control pin connected to the second switching apparatus;

wherein the first switching apparatus controls the status of the first power control unit via the first control pin, the second switching apparatus controls the status of the second power control unit via the second control pin, upon the condition that the first power control unit is turned on, the share-work-power module supplies power to the first electronic component; upon the condition that the second power control unit is turned on, the share-work-power module supplies power to the second electronic component.

14. The circuit as claimed in claim 13, wherein the first switching apparatus is a first jumper, the second switching apparatus is a second jumper, the first power control unit is a first control chip, the second power control unit is a second control chip, the first jumper comprises:

a first jumper power pin connected to a control-power source;

a first jumper ground pin being grounded; and a first jumper control pin selectively coupled to either the first jumper power pin or the first jumper ground pin, and the first jumper controlling the status of the first control chip;

the second jumper comprises:
  a second jumper power pin connected to the control-power source;
  a second jumper ground pin being grounded; and
  a second jumper control pin selectively coupled to either the second jumper power pin or the second jumper ground pin, and the second jumper controlling the status of the second control chip;

the first control chip comprises:
  a first control chip enable pin connected to the first jumper control pin;
  a first control chip input pin connected to the share-work-power module; and
  a first control chip output pin connected to the first electronic component; and the second control chip comprises:
  a second control chip enable pin connected to the second jumper control pin;
  a second control chip input pin connected to the share-work-power module; and
  a second control chip output pin connected to the second electronic component.

15. The circuit as claimed in claim 13, wherein the first switching apparatus is a first jumper, the second switching apparatus is a second jumper, the first power control unit is a first Metallic Oxide Semiconductor Field Effect Transistor (MOSFET), the second power control unit is a second MOSFET, the first jumper comprises:

a first jumper power pin connected to a control-power source;

a first jumper ground pin being grounded; and a first jumper control pin selectively coupled to the first jumper power pin or the first jumper ground pin, and the first jumper controlling the status of the first MOSFET;

the second jumper comprises:
  a second jumper power pin connected to the control-power source;
  a second jumper ground pin being grounded; and
  a second jumper control pin selectively coupled to the second jumper power pin or the second jumper ground pin, and the second jumper controlling the status of the second MOSFET;

the first MOSFET comprises:
  a first gate connected to the first jumper control pin;
  a first drain connected to the share-work-power module; and
  a first source connected to the first electronic component; and the second control chip comprises:
  a second gate connected to the second jumper control pin;
  a second drain connected to the share-work-power module; and
  a second source connected to the second electronic component.

* * * * *